(12) United States Patent
Graumann (10) Patent No.: US 10,416,795 B2
(45) Date of Patent: Sep. 17, 2019

(54) MECHANISM FOR EMPLOYING AND FACILITATING AN EDGE THUMB SENSOR AT A COMPUTING DEVICE

(71) Applicant: INTEL CORPORATION, Santa Clara, CA (US)

(72) Inventor: David L. Graumann, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 14/702,023

(22) Filed: May 1, 2015

(65) Prior Publication Data

US 2015/0309607 A1 Oct. 29, 2015

Related U.S. Application Data

(63) Continuation of application No. 13/976,978, filed as application No. PCT/US2011/054410 on Sep. 30, 2011, now Pat. No. 9,041,676.

(51) Int. Cl.
*G06F 3/041* (2006.01)
*G06F 3/044* (2006.01)
(Continued)

(52) U.S. Cl.
CPC ............ *G06F 3/041* (2013.01); *G06F 3/0362* (2013.01); *G06F 3/044* (2013.01); *G06F 3/0485* (2013.01); *G06F 2203/04103* (2013.01)

(58) Field of Classification Search
CPC . G06F 1/169–1692; G06F 3/041; G06F 3/044
(Continued)

(56) References Cited

U.S. PATENT DOCUMENTS

2006/0197750 A1 9/2006 Kerr et al.
2009/0256809 A1 10/2009 Minor
(Continued)

FOREIGN PATENT DOCUMENTS

JP 2007/072902 3/2007
JP 2010/176328 8/2010
JP 2010/262557 11/2010

OTHER PUBLICATIONS

PCT/US2011/054410, "Notification of Transmittal of the International Search Report and the Written Opinion of the International Searching Authority, or the Declaration" dated Oct. 4, 2012, pp. 9.
(Continued)

*Primary Examiner* — Michael Pervan
(74) *Attorney, Agent, or Firm* — Womble Bond Dickinson (US) LLP (57) ABSTRACT

A mechanism is described for employing and facilitating a thumb sensor at a computing device. A method of embodiments of the invention includes extending a touch panel of a computing device into a flap of the touch panel to be used as a side sensor of the computing device, and sensing a use of the side sensor, the use including touching of the side sensor by a user, where sensing may include detecting a change at one or more intersecting points of a plurality of intersecting points of conductive lines. The method may further include facilitating an action in response to the use of the side sensor.

15 Claims, 6 Drawing Sheets

(51) Int. Cl.
*G06F 3/0362* (2013.01)
*G06F 3/0485* (2013.01)

(58) Field of Classification Search
USPC .................... 178/18.01–19.07; 345/173–178
See application file for complete search history.

(56) References Cited

U.S. PATENT DOCUMENTS

| | | |
|---|---|---|
| 2010/0141607 A1 | 6/2010 | Ryoo et al. |
| 2010/0231548 A1 | 9/2010 | Mangione-Smith et al. |
| 2010/0315356 A1 | 12/2010 | Ferren et al. |
| 2011/0157065 A1 | 6/2011 | Murata et al. |
| 2013/0032414 A1* | 2/2013 | Yilmaz ................... G06F 1/169 |
| | | 178/18.06 |

OTHER PUBLICATIONS

Office Action from Counterpart JP Patent Application No. 2014-533277, dated Aug. 18, 2015, 7 pages.
PCT International Preliminary Report on Patentability for PCT/US2011/054410 dated Apr. 1, 2014.

* cited by examiner

FIG. 5

MECHANISM FOR EMPLOYING AND FACILITATING AN EDGE THUMB SENSOR AT A COMPUTING DEVICE

CLAIM OF PRIORITY

This application is a continuation application of U.S. patent application Ser. No. 13/976,978, entitled MECHANISM FOR EMPLOYING AND FACILITATING AN EDGE THUMB SENSOR AT A COMPUTING DEVICE, by David L. Graumann, filed Jun. 27, 2013, now allowed, which is a U.S. National Phase Application under 35 U.S.C. § 371 of International Application No. PCT/US 2011/054410, entitled MECHANISM FOR EMPLOYING AND FACILITATING AN EDGE THUMB SENSOR AT A COMPUTING DEVICE, by David L. Graumann, filed Sep. 30, 2011, the benefit of and priority to which are claimed thereof, and the entire contents of which are incorporated herein by reference.

FIELD

The field relates generally to computing devices and, more particularly, to employing a mechanism for employing and facilitating an edge thumb sensor at a computing device.

BACKGROUND

With the increase in the use of mobile device, it is getting increasingly important to make the mobile devices easy to use (e.g., using touch panels) but without having to increase the cost, size or complexity and/or reduce value, efficiency or existing features. None of the current technologies satisfy the aforementioned standards. For example, one way to increase touch panel sensitivity or functionality is to add a number of extra components to the device (e.g., a microcontroller, Central Processing Unit (CPU) drivers, cables or connectors, etc.) which results in increased cost, size, complexity, etc.

BRIEF DESCRIPTION OF THE DRAWINGS

Embodiments of the present invention are illustrated by way of example and not by way of limitation in the figures of the accompanying drawings, in which like references indicate similar elements and in which.

DETAILED DESCRIPTION

Embodiments of the invention provide a mechanism for employing and facilitating a thumb sensor at a computing device. A method of embodiments of the invention includes extending a touch panel of a computing device into a flap of the touch panel to be used as a side sensor of the computing device, and sensing a use of the side sensor, the use including touching of the side sensor by a user, where sensing may include detecting a change at one or more intersecting points of a plurality of intersecting points of conductive lines. The method may further include facilitating an action in response to the use of the side sensor.

In one embodiment, touch panel hardware of a computing device (e.g., smartphone, etc.) is used and its row and column electrical leads are extended into forming a thumb sensor and so no additional full sensor unit is needed as side sensor. This technique reduces hardware costs, device integration costs, manufacturing costs, unit testing cost, etc.

Figure 1:
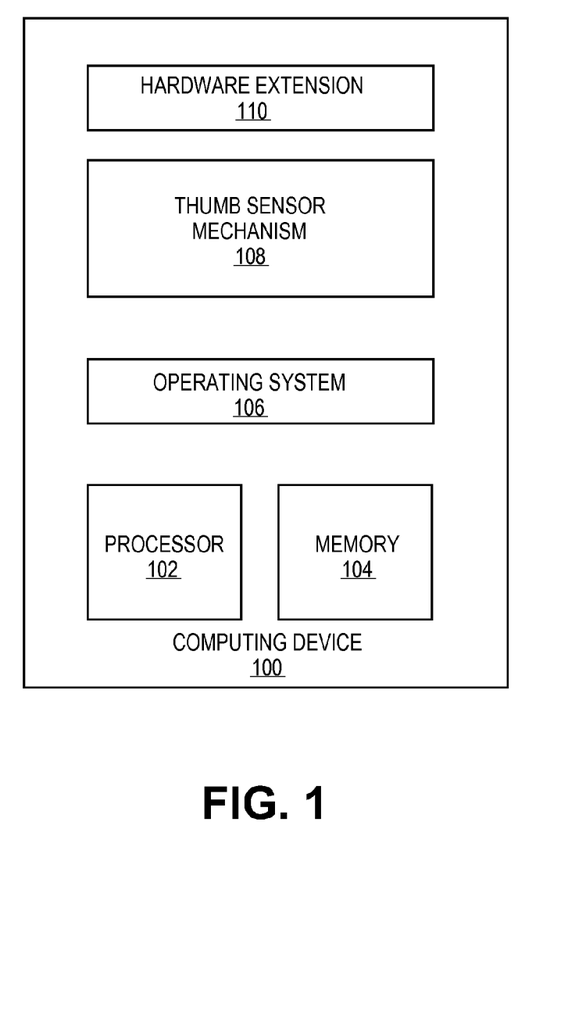
FIG. 1 illustrates a computing device employing and facilitating a thumb sensor mechanism according to one embodiment of the invention.

FIG. 1 illustrates a computing device employing and facilitating a thumb sensor mechanism according to one embodiment of the invention. In one embodiment, a computing device 100 is illustrated as having a thumb sensor mechanism 108 ("thumb mechanism") to employ and facilitate a thumb sensor. Computing device 100 includes a mobile computing device, such as a smartphone (e.g., iPhone®, BlackBerry®, etc.), a handheld computing device, a personal digital assistant (PDA), a tablet computer (e.g., iPad®, Samsung® Galaxy Tab®, etc.), a laptop computer (e.g., notebooks, netbooks, etc.), a set-top box (e.g., Internet-based cable television set-top box, etc.), a desktop computer, a server computer, etc. Computing device 100 further includes an operating system 106 serving as an interface between any hardware or physical resources of the computer device 100 and a user. Computing device 100 may further include a processor 102, memory devices 104, network devices, drivers, or the like. It is to be noted that terms like "machine", "device", "computing device", "computer", "computing system" and the like are used interchangeably and synonymously throughout this document.

In one embodiment, the computing device 100 further includes a hardware extension 110 that is used to provide the necessary hardware and/or circuitry to employ, adopt and facilitate a thumb sensor using the thumb sensor mechanism 108; for example, in one embodiment, a touch panel of the computing device 100 may be extended into a flap serving as a thumb sensor using the hardware extension 110 as will be further described with reference to the subsequent figures.

Figure 2:
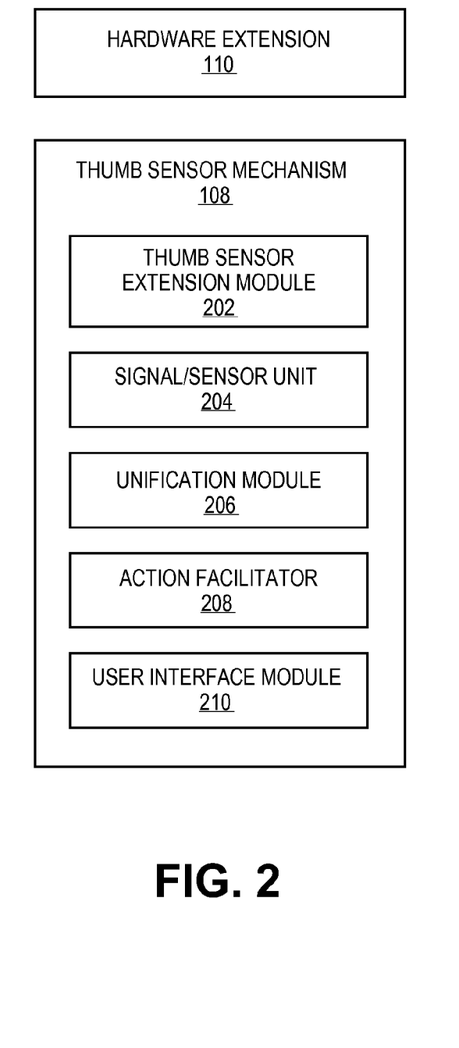
FIG. 2 illustrates a thumb mechanism employed at a computing device according to one embodiment of the invention.

FIG. 2 illustrates a thumb mechanism employed at a computing device according to one embodiment of the invention. In one embodiment, thumb mechanism 108 includes various components 202-208 to facilitate the use of a thumb sensor as described throughout this document. For example, thumb mechanism 108 includes a thumb sensor extension module 202 ("extension module") to work with the hardware extension 110 to understand and work the hardware circuitry needed to employ a flap-like extension of a touch panel of a computing device to serve as a thumb sensor. The extension module 202 is used to reduce the amount of hardware needed to employ the thumb sensor on one side (e.g., right side) of a mobile computing device using its touch panel hardware. This way, by extending the capacitive sensing capabilities of the touch panel to include the thumb sensor, the cost, size, packaging, etc., of the thumb sensor may be greatly reduced. For example, as set of X, Y scanning traces may be added to the touch panel (to project capacitive sensing) to scan traces that extend, for example, the touch panel's top right corner for right-handed users (or top left corners for left-handed users). This will be illustrated and further discussed with reference to FIG. 3.

In addition to the extension module 202, a signal/sensor unit 204 is employed to sense and analyze the user touch each time the user touches the thumb sensor. Similarly, a unification module 206 is employed to unify the existing touch panel of the mobile computing device and the flap serving as the thumb sensor so that, for example, the signal/sensor unit 204 can sense, analyze and calculate the signals and touches placed through the thumb sensor as it does when such signals and touches are placed through the touch panel. Further, to unify the touch panel and the thumb sensor, the two may be combined or unified to work together by, for example, employing a number of conductive lines that may run between the touch panel and the thumb sensor to provide a unified capacity sensing.

Thumb mechanism 108 further includes an action facilitator 208 which facilitate any action requested by the user through the thumb sensor. For example, if the user wishes to scroll down or up the screen using the thumb sensor, the action facilitator 208, working with other components 202-206, ensures that the screen is scrolled up or down as requested by the user. It is contemplated, as aforementioned, the thumb mechanism 108 works with the hardware extension 110 (e.g., providing the common conductive lines between the touch panel and the thumb sensor) to facilitate the functionality and operability of the thumb sensor. Finally, a user interface module 210 works with the hardware extension 110 to provide the user a user interface to conveniently work the thumb sensor in accordance with its intended purpose.

Embodiments of the invention provide that any number and type of components may be changed, added to or removed from the thumb mechanism 108 to facilitate the workings and operability of the thumb sensor. For brevity, clarity, ease of understanding and to focus on the thumb mechanism 108, many of the default or known components of a computing device are not shown or discussed here. For example, the display of the computing device may be continuously (re-) adjusted or (re-)align based on the changing information being communicated by user inputs via the thumb sensor.

Figure 3A:
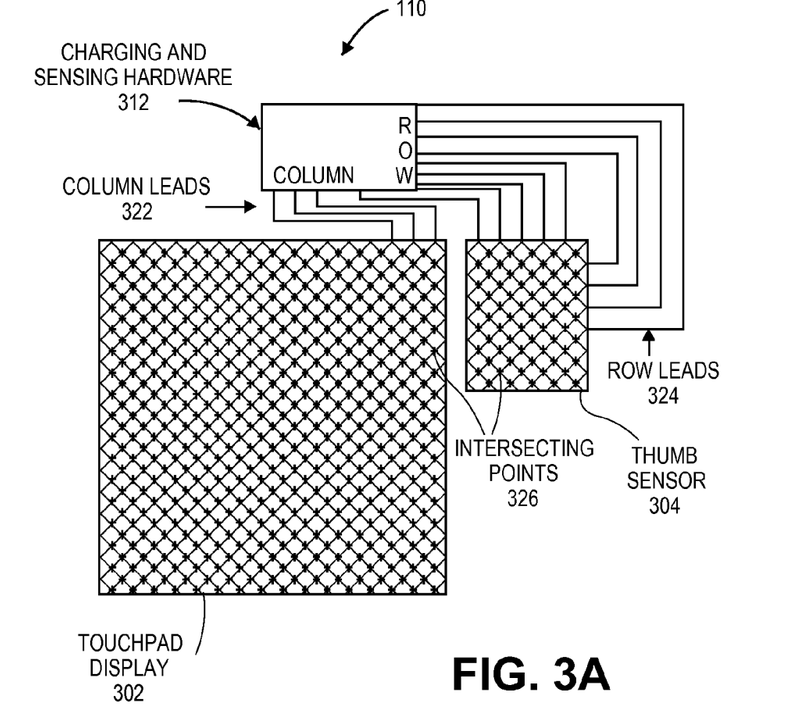
FIGS. 3A-3C illustrate a computing device employing and facilitating a thumb sensor using a thumb sensor mechanism according to one embodiment of the invention.
Figure 3B:
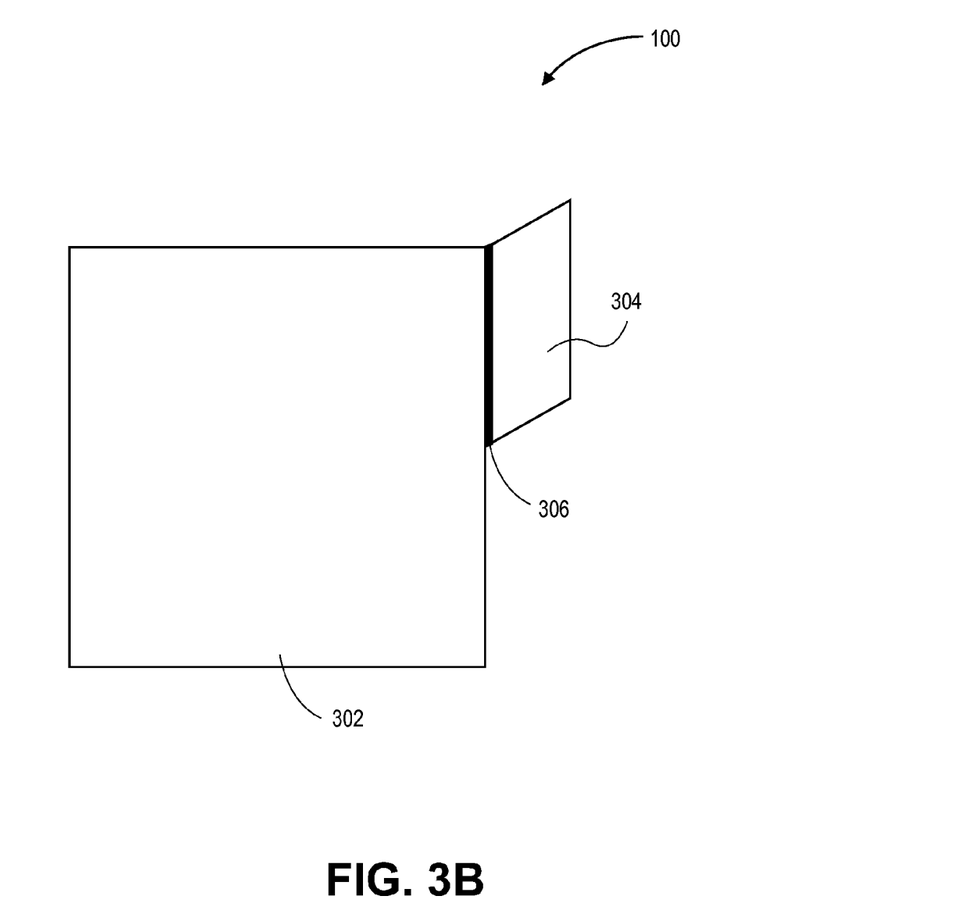
Figure 3C:
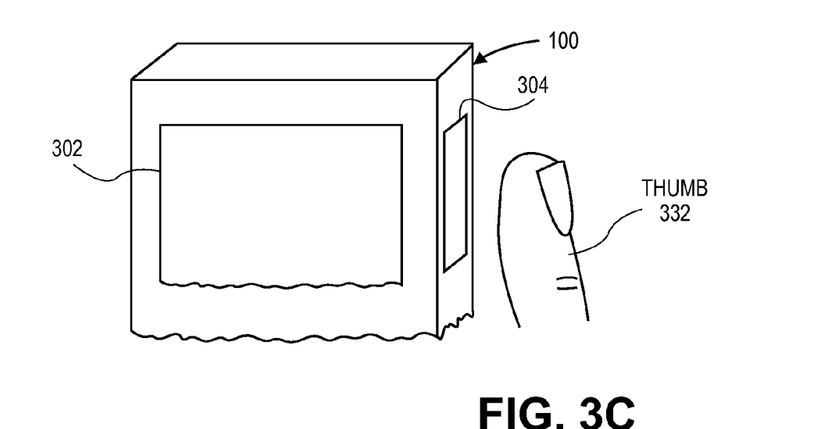

FIGS. 3A-3C illustrate a computing device employing and facilitating a thumb sensor using a thumb sensor mechanism according to one embodiment of the invention. FIG. 3A illustrates an embodiment of the hardware extension 110 FIGS. 1-2. In one embodiment, the hardware extension 110 provides a unified capacitive pad and circuitry for combined touch panel 302 and thumb sensor 304. Hardware extension 110 includes a charging and sensing hardware 312 to combine the touch panel 302 with the thumb sensor 304 into a unified hardware through, for example, conductive lines in column leads 322 and row leads 324 as is illustrated here. The number and nature of column and row leads 322, 324 are merely shown here as examples and for ease of understanding that it is contemplated the numbers and forms of these leads 322, 324 could be significantly complex in an actual computing device. As illustrated, and as aforementioned, the thumb sensor 304 is provided as a flap that may be a flexible extension of (or coupled through a flexible joint 306 with) the touch panel 302 of the mobile computing device 100. As illustrated in FIG. 3B, the flap thumb sensor 304 may then be wrapped at 90 degrees (at the joint 306) to the right and/or left side of the computing device 100. FIG. 3C illustrates one embodiment of the thumb sensor 304 as to how it may appear with respect to the touch panel 302 and a human thumb 332 as well as its placement on the computing device 100. It is contemplated that the embodiments are not limited to the illustrations of these figures and the positions, locations, connections, size, type, etc., of the touch panel 302 and the thumb sensor 304 may be altered with respect to the changing technology and/or consumer desires and necessities.

Referring back to FIG. 3A, the column and row leads 322, 324 may be electrical or electronic wires that serve as conductive lines that are closely spaced, such that they do not touch each other but rather form several small capacitors by being closely spaced at the row/column intersections 326. For example and in one embodiment, row leads 324 may be placed above (or below) the column lines 322 to form such closely-spaced intersections or intersecting points 326 serving as small capacitors to provide capacitive coupling of electrical conductors. Signal/sensor unit 204 of FIG. 2 may be used to sense the compound signals relating to these intersecting points 326 and any changes to these compound signals are then interpreted as a user input or signal being received from the thumb sensor 304 that is touched by the user. Capacitive sensing is based on capacitive coupling that is used in several different types of sensors to detect and measure proximity, location, position, movement, humidity, acceleration, etc.

For example, when a user touches the thumb sensor 304 in a particular manner, the user touch is then received by the unification module and then provided to the signal/sensor unit for analysis (e.g., evaluation and interpretation of the change detected at one or more intersecting points 326). Based on the analysis, an action plan is sent to the action facilitator of FIG. 2 to initiate or facilitate an appropriate action. For example, the analysis may reveal that the user touch was merely accidental or whether the user intended to press the thumb sensor 304 or wanted to scroll up and/or down, etc. The appropriate action may be displayed by and on the display screen (e.g., launching a new set of information, such as a new website, is displayed on the screen, clicking open a contact in an address book for details, scrolling up and/or down the screen, displaying an error message, etc.) of the computing device 100.

Figure 4:
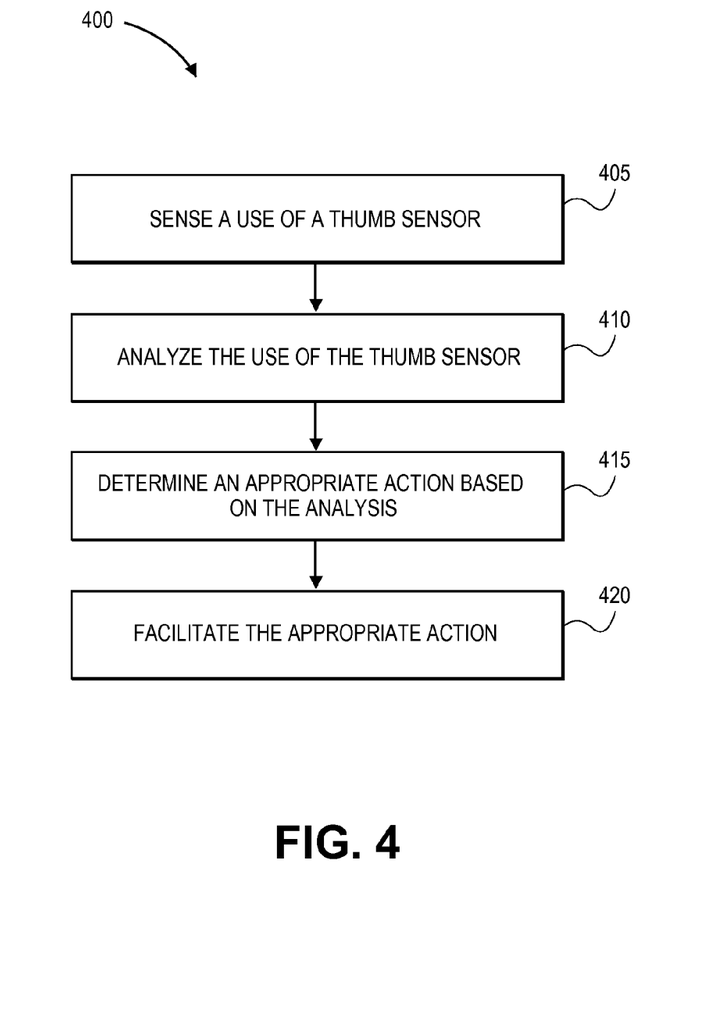
FIG. 4 illustrates a method for employing and facilitating a thumb sensor according to one embodiment of the invention.

FIG. 4 illustrates a method for employing and facilitating a thumb sensor according to one embodiment of the invention. Method 400 may be performed by processing logic that may comprise hardware (e.g., circuitry, dedicated logic, programmable logic, etc.), software (such as instructions run on a processing device), or a combination thereof. In one embodiment, method 400 may be performed by the thumb sensor mechanism of FIG. 1.

Method 400 starts at processing block 405 with sensing of a use of a thumb sensor. In other words, in one embodiment, each time a user touches (or presses or rolls) the thumb sensor, the use is sensed by detecting, as aforementioned, the intersecting points associated with the thumb sensor and a touch panel of the computing device. At block 410, the thumb sensor use is analyzed to determine the intended purpose of the use, such as, first, whether it was accidental or not and, second, if not, whether the thumb sensor was pressed or rolled or scrolled, etc., so that the intended purpose can be determined. At block 415, based on the analysis of the use, an appropriate action is determined. At block 420, the appropriate action is facilitated.

Figure 5:
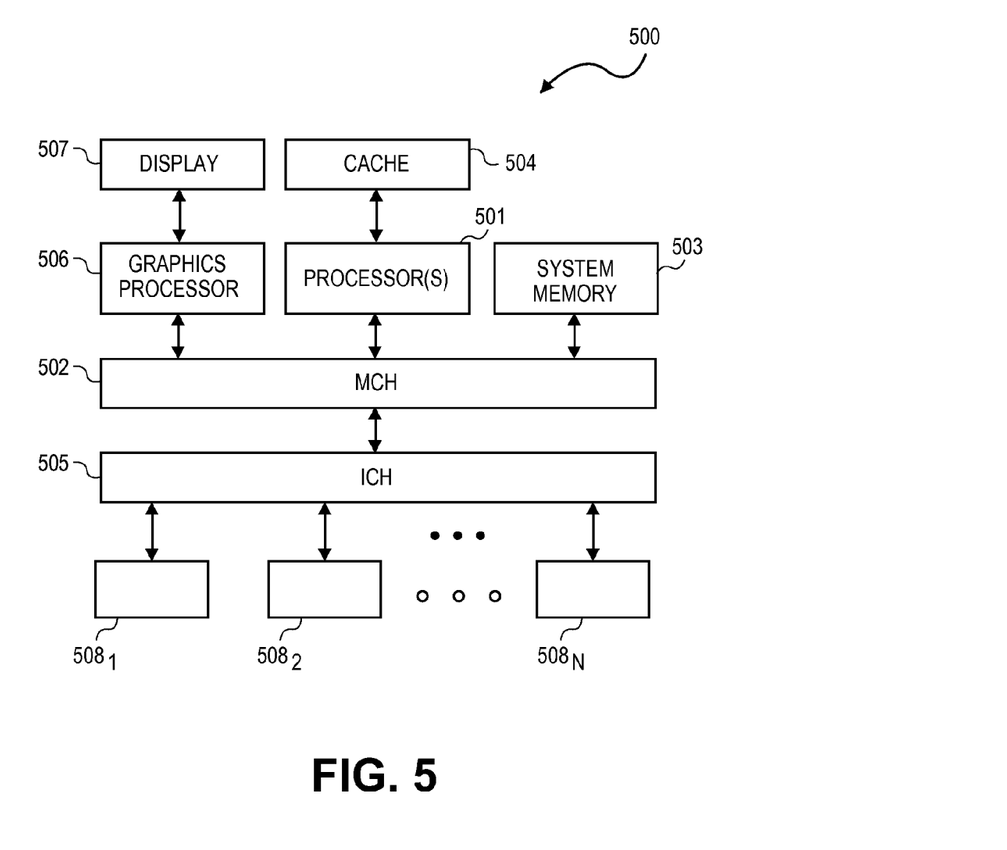
FIG. 5 illustrates a computing system according to one embodiment of the invention.

FIG. 5 illustrates a computing system 500 employing and facilitating a thumb sensor as referenced throughout this document according to one embodiment of the invention. The exemplary computing system 500 may be the same as or similar to the computing device 100 of FIG. 1 and include: 1) one or more processors 501 at least one of which may include features described above; 2) a memory control hub (MCH) 502; 3) a system memory 503 (of which different types exist such as double data rate RAM (DDR RAM), extended data output RAM (EDO RAM) etc.); 4) a cache 504; 5) an input/output (I/O) control hub (ICH) 505; 6) a graphics processor 506; 7) a display/screen 507 (of which different types exist such as Cathode Ray Tube (CRT), Thin Film Transistor (TFT), Light Emitting Diode (LED), Molecular Organic LED (MOLED), Liquid Crystal Display (LCD), Digital Light Projector (DLP), etc.; and 8) one or more I/O devices 508.

The one or more processors 501 execute instructions in order to perform whatever software routines the computing system implements. The instructions frequently involve some sort of operation performed upon data. Both data and instructions are stored in system memory 503 and cache 504. Cache 504 is typically designed to have shorter latency times than system memory 503. For example, cache 504 might be integrated onto the same silicon chip(s) as the processor(s) and/or constructed with faster static RAM (SRAM) cells whilst system memory 503 might be constructed with slower dynamic RAM (DRAM) cells. By tending to store more frequently used instructions and data in the cache 504 as opposed to the system memory 503, the overall performance efficiency of the computing system improves.

System memory 503 is deliberately made available to other components within the computing system. For example, the data received from various interfaces to the computing system (e.g., keyboard and mouse, printer port, Local Area Network (LAN) port, modem port, etc.) or retrieved from an internal storage element of the computer system (e.g., hard disk drive) are often temporarily queued into system memory 503 prior to their being operated upon by the one or more processor(s) 501 in the implementation of a software program. Similarly, data that a software program determines should be sent from the computing system to an outside entity through one of the computing system interfaces, or stored into an internal storage element, is often temporarily queued in system memory 503 prior to its being transmitted or stored.

The ICH 505 is responsible for ensuring that such data is properly passed between the system memory 503 and its appropriate corresponding computing system interface (and internal storage device if the computing system is so designed). The MCH 502 is responsible for managing the various contending requests for system memory 503 accesses amongst the processor(s) 501, interfaces and internal storage elements that may proximately arise in time with respect to one another. In one embodiment, the MCH 502 and ICH 505 may not be separately employed; but rather, be provided as part of a chip set that includes the MCH 502, ICH 505, other controller hubs, and the like.

One or more I/O devices 508 are also implemented in a typical computing system. I/O devices generally are responsible for transferring data to and/or from the computing system (e.g., a networking adapter); or, for large scale non-volatile storage within the computing system (e.g., hard disk drive). ICH 505 has bi-directional point-to-point links between itself and the observed I/O devices 508.

Portions of various embodiments of the present invention may be provided as a computer program product, which may include a computer-readable medium having stored thereon computer program instructions, which may be used to program a computer (or other electronic devices) to perform a process according to the embodiments of the present invention. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

In the foregoing specification, the invention has been described with reference to specific exemplary embodiments thereof. It will, however, be evident that various modifications and changes may be made thereto without departing from the broader spirit and scope of the invention as set forth in the appended claims. The Specification and drawings are, accordingly, to be regarded in an illustrative rather than a restrictive sense.

I claim:

1. A method of manufacturing a sensor, the method comprising:
    extending a touch panel of a computing device using a flap representing an edge of the computing device in order to create a unified touch sensor of the computing device, the flap coupled with the touch panel through a flexible joint,
    wherein the touch panel is not continuous with the flap representing the edge of the computing device and the flexible joint separates the flap from the touch panel,
    wherein extending the touch panel includes unifying the touch panel and the edge into the unified touch sensor, and
    wherein unifying includes facilitating the touch panel to adopt scanning traces from the flap to project unified capacitive sensing to the edge.

2. The method of claim 1, wherein the unified touch sensor includes:
    one or more side sensors placed at one or more sides of the computing device, wherein the unified touch sensor is provided at a 90° degree angle from the touch panel on a front of the computing device, wherein the unified capacitive sensing to facilitate sensing of a user touch to the unified touch sensor, wherein sensing includes detecting a change at one or more intersecting points of a plurality of intersecting points of conductive lines running between the touch panel and the edge.

3. The method of claim 1, wherein the unified touch sensor includes:

one or more side sensors placed at one or more sides of the computing device, wherein the unified touch sensor is provided at an angle other than ninety degrees from the touch panel on a front of the computing device.

4. The method of claim 1, wherein the unified touch sensor comprises a thumb sensor to be triggered by a user touch provided through a user thumb or one or more user fingers.

5. The method of claim 1, wherein the computing device comprises one or more of a mobile computing device, a laptop computer, a desktop computer, and a set-top box, wherein the mobile computing device comprises one or more of a smartphone, a handheld computing device, a personal digital assistant (PDA), and a tablet computer, and wherein the laptop computer comprises a notebook or a netbook.

6. A method for a touch sensor comprising:
sensing a user touch to a unified touch sensor of a computing device;
extending a touch panel of the computing device using a flap representing an edge of the computing device, the flap coupled with the touch panel through a flexible joint,
wherein the touch panel is not continuous with the flap representing the edge of the computing device and the flexible joint separates the flap from the touch panel,
wherein extending the touch panel includes unifying the touch panel and the edge into the unified touch sensor,
wherein unifying includes facilitating the touch panel to adopt scanning traces from the flap to project unified capacitive sensing to the edge; and
facilitating an action in response to the user touch of the unified touch sensor.

7. The method of claim 6, further comprising:
analyzing the use to determine an intended purpose of the use by the user; and
selecting an action in response to the use and in accordance with the determined intended purpose, wherein the unified capacitive sensing to facilitate the sensing of the user touch to the unified touch sensor, wherein sensing includes detecting a change at one or more intersecting points of a plurality of intersecting points of conductive lines running between the touch panel and the edge.

8. The method of claim 6, wherein sensing further comprises receiving a message relating to the use of the unified touch sensor from the one or more intersecting points of the plurality of intersecting points, wherein the plurality of intersecting points are generated by placing first conductive lines provided in the touch panel over second conductive lines provided in the edge of the computing device.

9. A system comprising:
a computing device having a memory to store instructions for facilitating an edge sensor mechanism, and a processing device to execute the instructions, wherein the instructions cause the processing device to:
sense a user touch to a unified touch sensor of the computing device;
extend a touch panel of the computing device using a flap representing an edge of the computing device in order to create a unified touch sensor of the computing device, the flap coupled to the touch panel through a flexible joint,
wherein the touch panel is not continuous with the flap representing the edge of the computing device and the flexible joint separates the flap from the touch panel,
wherein extending the touch panel includes unifying the touch panel and the edge into the unified touch sensor,
wherein unifying includes facilitating the touch panel to adopt scanning traces from the flap to project unified capacitive sensing to the edge, wherein the edge serves as the unified touch sensor such that the touch panel adopts scanning traces to project unified capacitive sensing to the edge.

10. The system of claim 9, wherein the processing device is further to analyze the use to:
determine an intended purpose of the use by the user; and
select an action in response to the use and in accordance with the determined intended purpose, wherein the unified capacitive sensing to facilitate sensing of a user touch to the unified touch sensor, wherein sensing includes detecting a change at one or more intersecting points of a plurality of intersecting points of conductive lines running between the touch panel and the edge.

11. The system of claim 9, wherein sensing further comprises:
receiving a message relating to the use of the unified touch sensor from the one or more intersecting points of the plurality of intersecting points, wherein the plurality of intersecting points are generated by placing first conductive lines provided in the touch panel over second conductive lines provided in the edge.

12. The system of claim 9, wherein the unified touch sensor includes one or more side sensors placed at one or more sides of the computing device, wherein the unified touch sensor is provided at a ninety degree angle from the touch panel on a front of the computing device.

13. The system of claim 9, wherein the unified touch sensor includes one or more side sensors placed at one or more sides of the computing device, wherein the unified touch sensor is provided at an angle other than ninety degrees from the touch panel on a front of the computing device.

14. The system of claim 9, wherein the unified touch sensor comprises a thumb sensor to be triggered by a user touch provided through a user thumb or one or more user fingers.

15. The system of claim 9, wherein the computing device comprises one or more of a mobile computing device, a laptop computer, a desktop computer, and a set-top box, wherein the mobile computing device comprises one or more of a smartphone, a handheld computing device, a personal digital assistant (PDA), and a tablet computer, and wherein the laptop computer comprises a notebook or a netbook.

* * * * *